(12) United States Patent
Liberty et al.

(10) Patent No.: US 7,845,443 B2
(45) Date of Patent: Dec. 7, 2010

(54) LOW SURFACE IMPACT SKID STEERED ALL TERRAIN VEHICLE

(75) Inventors: David K. Liberty, 944 Pinecreek Road, Callander, Ontario (CA) P0H 1H0; David W. Murdoch, 742 South River Road, Nippissing, Ontario (CA) P0H 1W0

(73) Assignees: David K. Liberty, Ontario (CA); David W. Murdoch, Ontario (CA); Gary Martin, Boca Grande, FL (US)

( * ) Notice: Subject to any disclaimer, the term of this patent is extended or adjusted under 35 U.S.C. 154(b) by 219 days.

(21) Appl. No.: 12/205,092

(22) Filed: Sep. 5, 2008

(65) Prior Publication Data
US 2009/0078480 A1 Mar. 26, 2009

Related U.S. Application Data

(60) Provisional application No. 60/974,992, filed on Sep. 25, 2007.

(51) Int. Cl.
*B62D 11/00* (2006.01)
*B62D 61/10* (2006.01)

(52) U.S. Cl. .................. 180/24.07; 180/6.48; 180/22

(58) Field of Classification Search ............ 180/6.48, 180/6.7, 9.1, 9.23, 9.36, 9.5, 9.54, 22, 24.01, 180/24.02, 24.03, 24.06, 24.07, 24.08, 24.09, 180/24.11
See application file for complete search history.

(56) References Cited

U.S. PATENT DOCUMENTS

| | | | | |
|---|---|---|---|---|
| 3,063,510 A | * | 11/1962 | Hunger et al. | 180/9.1 |
| 3,443,654 A | * | 5/1969 | Schoonover | 180/9.62 |
| 3,444,837 A | | 5/1969 | Donofrio | |
| 3,653,455 A | * | 4/1972 | Hetteen | 180/251 |
| 3,669,467 A | | 6/1972 | Dunlap et al. | |
| 3,799,362 A | | 3/1974 | Oswald et al. | |
| 3,918,738 A | | 11/1975 | Raidel | |
| 4,274,502 A | | 6/1981 | Somerton-Rayner | |
| 4,359,116 A | | 11/1982 | Mankey | |
| 4,379,571 A | * | 4/1983 | Simmons | 280/656 |
| 4,470,475 A | | 9/1984 | Carlson | |
| 4,549,610 A | | 10/1985 | van der Lely | |
| 4,600,069 A | * | 7/1986 | Oswald et al. | 180/24.02 |
| 5,531,282 A | * | 7/1996 | Jennen | 180/9.1 |
| 5,683,098 A | | 11/1997 | VanDenberg | |
| 5,909,780 A | * | 6/1999 | De Andrade | 180/9.58 |
| 5,944,339 A | * | 8/1999 | McKenzie et al. | 280/678 |

(Continued)

FOREIGN PATENT DOCUMENTS

WO 86/04306 7/1986

*Primary Examiner*—Tony H. Winner
*Assistant Examiner*—Marc A Scharich
(74) *Attorney, Agent, or Firm*—Wood, Herron & Evans, LLP (57) ABSTRACT

A low surface impact, skid steered, all terrain vehicle is disclosed which has a rectangular frame from which sets of tandem mounted, independently movable control arms are suspended. A hydraulic motor driven wheel axle is mounted on a lower end of each control arm with at least one pneumatic wheel mounted upon each wheel axle. Separate hydraulic control circuits having separate drive pumps drive the hydraulic motors on each side of the vehicle. Each of these hydraulic control circuits is operable in either a series connected mode or a parallel connected mode.

22 Claims, 9 Drawing Sheets

U.S. PATENT DOCUMENTS

| | | | |
|---|---|---|---|
| 6,012,724 A | 1/2000 | Pitkanen | |
| 6,076,619 A * | 6/2000 | Hammer | 180/6.48 |
| 6,125,954 A * | 10/2000 | Oota et al. | 180/6.48 |
| 6,135,220 A * | 10/2000 | Gleasman et al. | 180/9.1 |
| 6,289,995 B1 * | 9/2001 | Fuller | 169/52 |
| 6,634,445 B2 | 10/2003 | Dix et al. | |
| 7,004,270 B2 * | 2/2006 | Hori et al. | 180/9.52 |
| 7,128,175 B1 * | 10/2006 | Martineau | 180/7.1 |
| 7,131,507 B2 * | 11/2006 | Wenger et al. | 180/6.7 |
| 7,267,409 B2 | 9/2007 | Azocar | |
| 2004/0135336 A1 | 7/2004 | Lamela et al. | |
| 2004/0216932 A1 | 11/2004 | Giovanetti et al. | |
| 2006/0273540 A1 | 12/2006 | Heron et al. | |
| 2009/0166101 A1 * | 7/2009 | Wenger et al. | 180/6.7 |
| 2010/0059297 A1 * | 3/2010 | Urbanik et al. | 180/6.7 |

* cited by examiner

| ITEM | QTY. | DESCRIPTION | MANUFACTURER |
|---|---|---|---|
| 76 | 1 | VARIABLE DISPLACEMENT TANDEM PUMP | SAUER DANFOSS |
| 99 | 1 | CHARGE PRESSURE GEAR PUMP | SAUER DANFOSS |
| 66 | 6 | WHEEL MOTOR | SAUER DANFOSS |
| 66D, 66H | 2 | WHEEL MOTOR W/ BRAKE | SAUER DANFOSS |
| 80, 84 | 2 | SERIES/PARALLEL SOLENOID VALVE | SAUER DANFOSS |
| 94 | 1 | BRAKE CONTROL SOLENOID VALVE | SAUER DANFOSS |
| 102 | 1 | FILTER HEAD BODY | DONALDSON |
| | | FILTER ELEMENT | |
| | | CONDITION INDICATOR | |
| 114 | 1 | HYDRAULIC OIL COOLER | THERMAL TRANSFER |
| 98 | 1 | SUCTION STAINER | DONALDSON |
| 112 | 1 | 20 GALLON RESERVOIR | BY CUSTOMER |
| 90, 92 | 2 | WHEEL MOUNT BRAKE | MICO |
| 81a, 81b 85a, 85b | 4 | 50-50 CONTROL VALVE | SAUER DANFOSS |

LOW SURFACE IMPACT SKID STEERED ALL TERRAIN VEHICLE

RELATED APPLICATIONS AND PATENTS

This application claims priority from U.S. Provisional Patent Application Ser. No. 60/974,922, filed Sep. 25, 2007.

TECHNICAL FIELD

The present invention relates in general to a skid steered all terrain vehicle and particularly to such a vehicle which is so structured and driven that it imparts a minimal ground pressure on the terrain over which it is movable.

BACKGROUND ART

Traditionally, vehicles which operate over adverse terrain, such as rocky terrain, snow covered terrain or swamps, have been skid steered vehicles. Some of these vehicles are track driven, such as bulldozers, loaders, excavators and other heavy industrial vehicles and, others are wheel driven. Many of these wheel driven, skid steered, all terrain vehicles are so constructed as to have low impact, pneumatic wheels engaged with the adverse surface terrain. Examples of such wheeled vehicles capable of being skid steered and intended to have low surface impact are to be found in U.S. Pat. Nos. 3,799,362 and 4,359,116. While the vehicles disclosed in both of these patents are intended to be low ground pressure or surface impact vehicles, they both require lowered middle wheels to facilitate skid steering and both impart greater ground pressure than is desirable for many applications. Additionally, both require chain or mechanical drive systems to all of the axles of these multiple axle vehicles. Chain driven systems are generally undesirable because they need constant attention, suffer from wear, suffer from constant attention to tensioning of the chains and require regular lubrication of the chains. Additionally, these chain driven vehicles also generally suffer from a lack of independent suspension of the individual wheels.

Another chain driven skid steered, wheeled vehicle is disclosed in International Publication No. WO 86/04306. According to the disclosure of this publication, a single hydraulic motor is operable to drive a pair of wheels with there being two pairs of wheels on each side of the vehicle. Because under some operating conditions there is a problem with fluid flow to the hydraulic motor attached to a wheel which has lost contact with the ground, the independently mounted wheels of this vehicle are interconnected by an endless chain so that all of the wheels on one side of the vehicle are made to revolve at the same speed, irrespective of the mode of interconnection of hydraulic motors. Here again, this gives rise to the problem set forth hereinabove relative to wear of the chains and sprockets and maintenance of the appropriate tension of the chain drive system. And, of course, the cost of installation of mechanical driven systems interconnecting the wheels on each side of the vehicle gives rise to increased costs relative to the overall cost of the vehicle.

It has therefore been an objective of this invention to provide a skid steered vehicle having independent suspension of the wheels and characterized by hydraulic drive motors associated with multiple axles of the vehicle so as to minimize surface or ground pressure imparted by the vehicle to the ground surface or terrain over which the vehicle is movable. Still another object of the invention has been to provide such a vehicle which is more effectively and easily capable of skid steering without the need for lowered middle wheels as required in some skid steered vehicles, such as those disclosed in U.S. Pat. Nos. 3,799,362 and 4,359,116.

DISCLOSURE OF THE INVENTION

The invention of this application comprises a vehicle having a frame upon the opposite sides of which there are multiple independently suspended hydraulically motor driven axles. Each of these axles is mounted on a control arm which is in turn pivotally suspended from the vehicle frame. These control arms are mounted in pairs with each pair extending downwardly in an opposite direction from the machine frame. At least one, and preferably two, hubs are mounted on the lower end of each control arm so as to be driven from an hydraulic motor attached to each axle. Low pressure pneumatic wheels are mounted upon these hubs. Elastomeric springs are located between each control arm and the frame so as to bias the control arms downwardly into ground contact of the hub mounted wheels or endless track. There are also friction plates attached to each hanger arm so as to limit the movement of control arms toward one another and prevent the hub mounted wheels from coming into contact with adjacent wheels. These friction plates on adjacent control arms enable the wheels on those arms to move together in the same direction while the friction plates remain in contact and without these wheels coming into contact.

In a second modification of the invention and the suspension system of the invention, an endless track is mounted over each pair of tandem mounted wheel sets so as to further reduce surface pressure of the vehicle with the surface over which it is movable and to increase surface traction with that surface.

The propulsion system for the hydraulic motors mounted on each of the axles comprises a pair of motor driven pumps. There is a first hydraulic circuit for supplying fluid power from the first motor driven pump to all of the hydraulic motors drivingly secured to the axles on one side of the vehicle frame. And there is a second hydraulic circuit for supplying fluid power from the second motor driven pump to all of the hydraulic motors drivingly connected to the axles on the opposite or second side of the vehicle. The hydraulic circuits are so connected and valved that they are operable to interconnect the hydraulic motors on one side of the frame either in a parallel connected circuit or a series connected circuit. In the series connected mode of operation of each circuit, the pumps supply equal fluid flow and pressure to all of the wheels on one side of the vehicle. In the parallel connected mode, the circuits split the flow to the front and rear sets of wheels on each side of the vehicle so as to obtain better steering control of the vehicle. This parallel flow mode facilitates skid turning of the vehicle by causing a selected set of wheels on one side of the vehicle to turn even if the other set of wheels on the same side are off of the ground and spinning. The circuits are independently operable in either a forward or reverse direction such that the wheels on one side may be driven, for example, forward and the those on the opposite side rearward so as to enable the vehicle to turn. And if the pumps and control circuits are operated in the parallel mode while the wheels on opposite sides of the vehicle are driven in opposite directions, the vehicle will be very effectively skid steered or turned. If more traction is desired to all of the wheels, then the circuits may be switched to series connection of the motors to the pumps.

The primary advantage of this invention is that it provides a very low surface impact skid steered vehicle operable either as a wheel driven vehicle or a track driven vehicle. In practice, and in one preferred embodiment, the vehicle has eight axles and sixteen wheels which enables a 1,900 pound vehicle to move over a surface imparting no more than two pounds per square inch of pressure on that supported surface. When four endless tracks are added over the wheels, the 1,900 pound vehicle is capable of moving over a supporting surface while imparting no more than one pound per square inch of pressure to that supporting surface. As an alternative to the eight axle, sixteen wheels, the vehicle may have eight axles and eight wheels in which event the vehicle wheels will generally be larger in diameter and width so that the wheels still have a large footprint, generally on the order of 80% of that of the sixteen wheel vehicle.

BRIEF DESCRIPTION OF THE DRAWINGS

These and other advantages of this invention will be more apparent from the following description of the drawings in which.

DESCRIPTION OF A PREFERRED EMBODIMENT OF THE INVENTION

Figure 1:
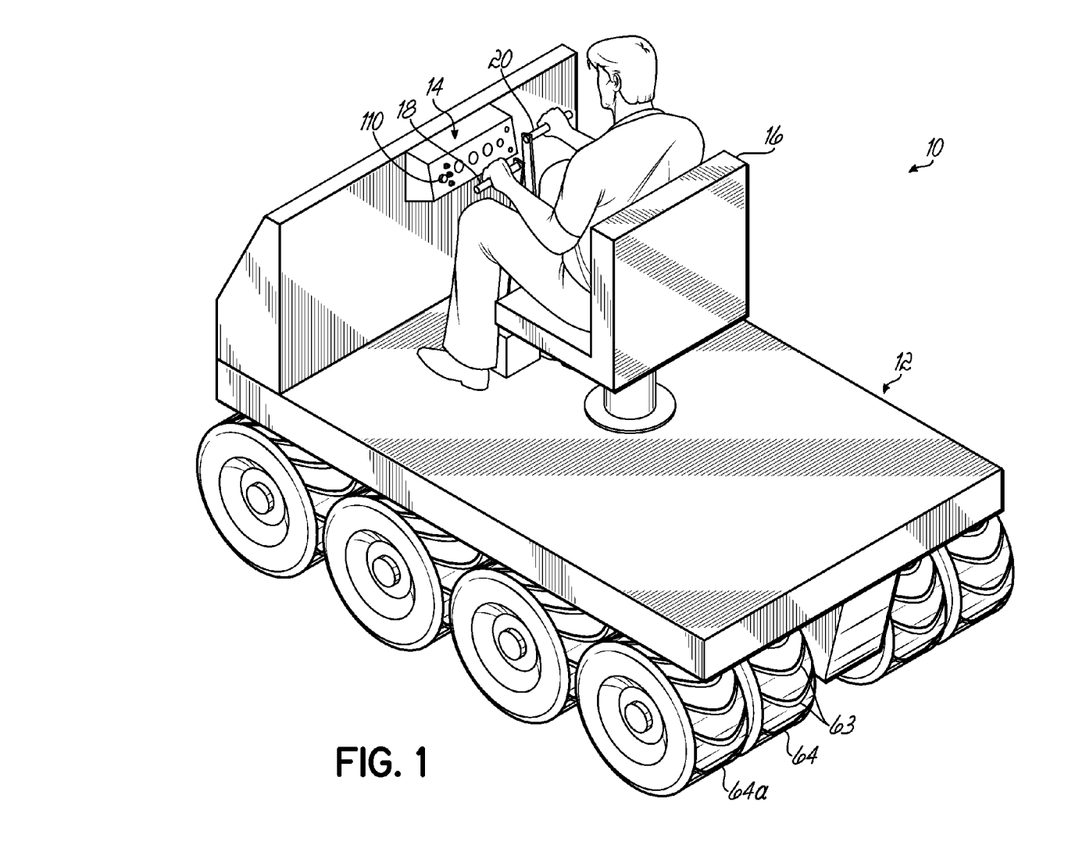
FIG. 1 is a perspective view of a low surface impact, skid steered, all terrain vehicle incorporating the invention of this application.

With reference to FIG. 1, there is illustrated one preferred embodiment of a low surface impact skid steered all terrain vehicle 10 incorporating the invention of this application. This vehicle includes a flat bed 12 having a front control panel 14 and a seat 16 upon which a driver sits when operating a pair of control levers 18, 20 for driving the vehicle either forwards or backwards or turning in a skid steering mode as explained more fully hereinafter.

While not illustrated in the drawing, the rear of the flat bed 12 of the vehicle is intended to mount or carry equipment over varying surface terrain. That equipment may consist of a drilling rig or backhoe or some other digging equipment, wire laying equipment or other field equipment. Most commonly, though, this vehicle would be utilized in environments where surface impact is critical as, for example, in mining operations where government rules and regulations dictate a minimal surface impact of the vehicle to the terrain over which the vehicle is movable.

Figure 2:
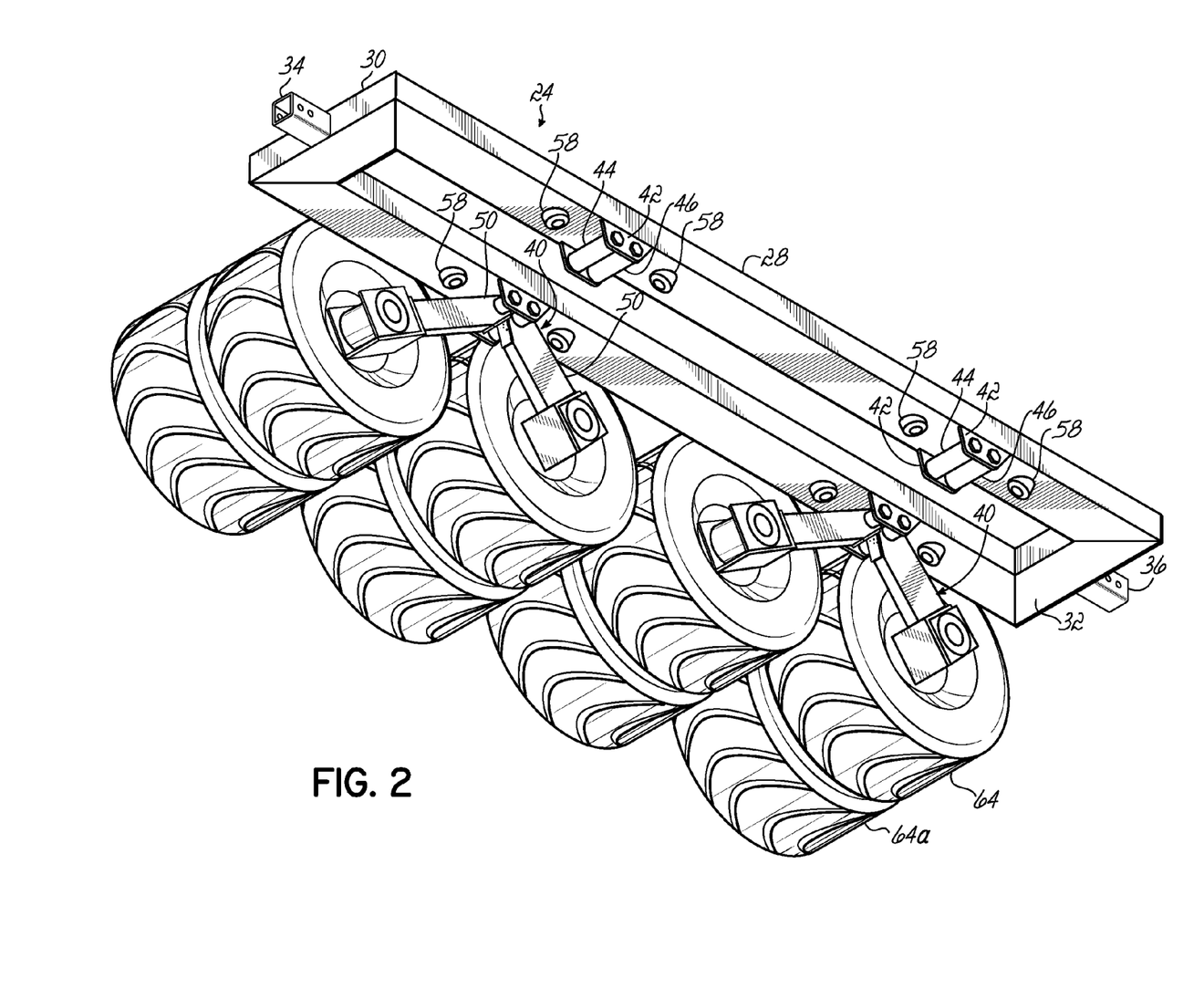
FIG. 2 is a perspective view, partially broken away and with some parts removed, of the underside of the vehicle of FIG. 1.

Mounted on the underside of the flat bed 12 of the vehicle, there is a frame or undercarriage 24 (FIG. 2). This frame or undercarriage 24 is generally rectangular having a right side member 26 and a left side member 28 interconnected by front and rear cross members 30, 32, respectively. Front and rear auxiliary equipment brackets 34, 36 are generally mounted upon the front and rear cross members, respectively, so as to facilitate mounting of auxiliary equipment or attachment of trailers, etc., to the vehicle.

In FIG. 2, a pair of suspension systems 40 on the right side of the vehicle frame have been illustrated and shown thereon. For purposes of clarity, the suspension systems 40 on the left side of the vehicle have been omitted from FIG. 2, but it is to be understood that in the normal course of use and operation of the vehicle, and as illustrated in FIG. 1, there would usually be two pairs of tandem suspension systems 40 on each side of the vehicle. Of course, there could be a greater number of tandem suspension systems on each side of the vehicle depending upon the loads, terrain, size of the equipment to be utilized and mounted upon the bed of the vehicle, etc.

Each tandem suspension system 40 includes a channel-shaped hanger bracket 42 welded or otherwise secured to the underside of the frame member 26 or 28. Each channel-shaped hanger bracket 42 supports a pair of control arm hanger pins 44, 46 from which control arms 50 are suspended. At the upper end, each control arm 50 has a rounded section 52 (see FIG. 3) and a chamfered section 54. The chamfered section 54 extends at approximately a 45° angle to the sides of the generally rectangular-shaped control arms. A friction plate 56 is fixedly secured to each of the chamfered sections 54. As may be seen most clearly in FIG. 4, these friction plates 56 function to limit movement of each pair of control arms of a suspension system 40 toward one another, and thereby prevent wheels mounted on the lower ends of those control arms from coming into abutting contact.

Each tandem suspension system 40 also includes a pair of elastomeric springs 58 fixedly mounted on the underside of the side frame members 26, 28 between each control arm 50 and the underside of the frame. These elastomeric springs 58 tend to bias the control arms downwardly while still permitting them to move upwardly toward the frame against the bias of the springs. Since there are eight control arms mounted on the four tandem suspension brackets 42 of the frame, there are eight such elastomeric springs mounted on the underside of the frame between the frame and the control arms.

Mounted upon the lower end of each control arm 50, there is a hydraulic motor 66 driven axle 60. At least one, and preferably two, wheel rims 62 are mounted upon each axle so as to be driven in rotation from a hydraulic motor 66 attached to the inner end of each axle. In the illustrated embodiment, there are two wheel rims 62, 62a mounted upon each axle 60 and likewise, two wheels 64, 64a mounted upon these hubs 62, 62a. The wheels 64, 64a are low pressure pneumatic tires which have paddles 63 on their outer surfaces rather than lugs so as to impart minimal damage to terrain over which the vehicle is movable.

Figure 3:
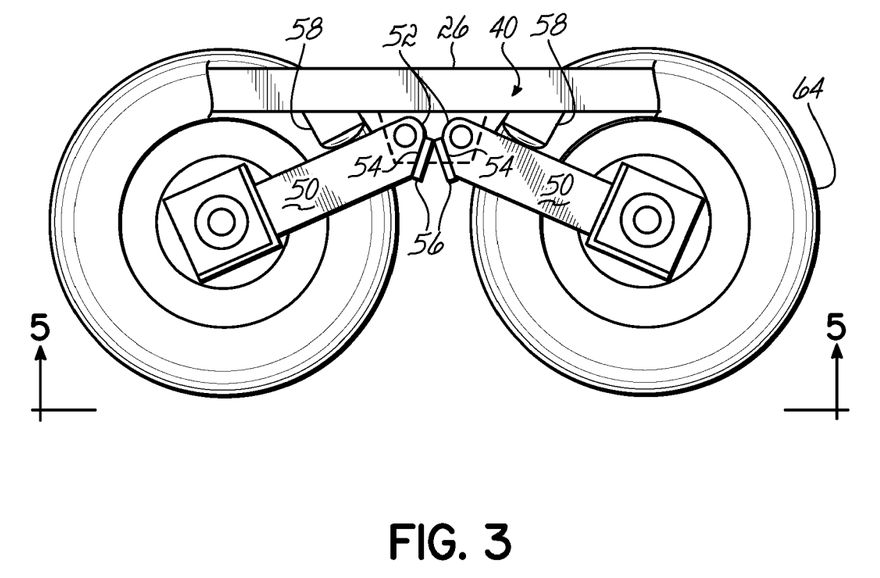
FIG. 3 is a side elevational view of the suspension system of a pair of tandem mounted wheels illustrating the suspension system for those wheels in its maximum compressed condition with minimal ground clearance of the vehicle frame from the supporting surface.
Figure 4:
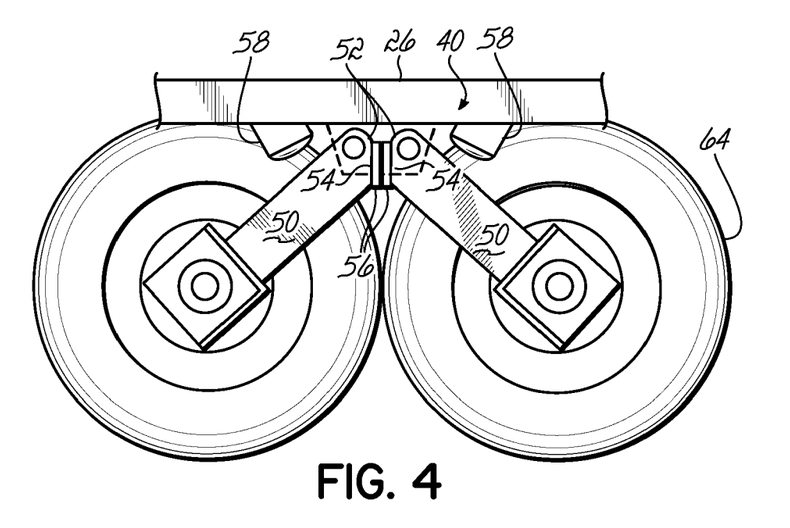
FIG. 4 is a view similar to FIG. 3, but with the suspension system in its position of maximum ground clearance of the frame from the supporting surface.
Figure 5:
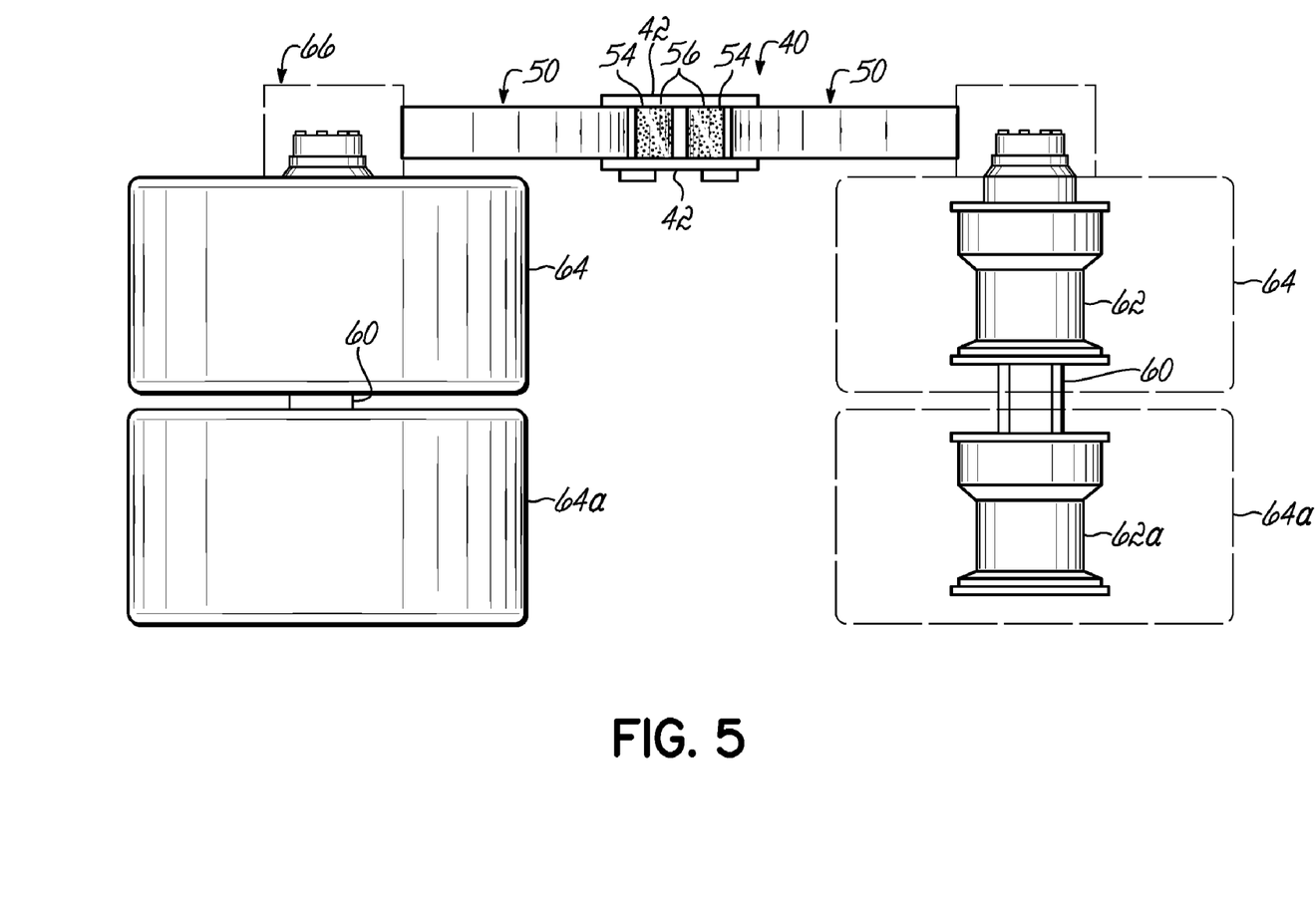
FIG. 5 is a front elevational view taken on line 5-5 of FIG. 3, but with the wheels in phantom and removed from one set of axle mounted wheel hubs.

With reference now to FIG. 4, it will be seen that with minimal load or no load upon the bed of the vehicle 10, the wheels may move toward one another under the bias of the elastomeric springs 58 which force the control arms downwardly toward one another until the friction plates 56 contact one another. In this position, with the friction plates 56 contacting the wheels of a tandem suspension system 40, the wheels are in close proximity, but not touching. When a load, though, is placed upon the bed of the vehicle, the elastomeric springs will be compressed (see FIG. 3). As the load forces the frame downwardly, the elastomeric springs 58 compress until fully compressed, as illustrated in FIG. 3.

Figure 6:
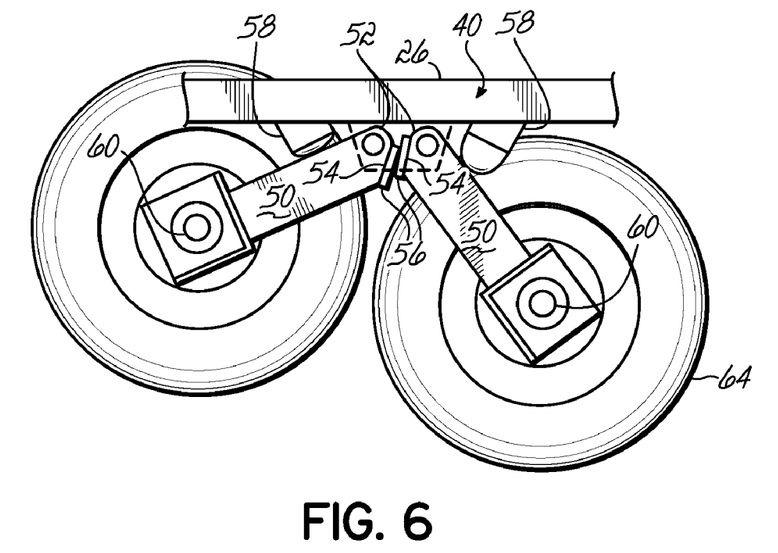
FIG. 6 is a view similar to FIG. 3, but illustrating the suspension system in a condition wherein one of a pair of tandem mounted wheels is in its position of maximum compression and the other of the pair of tandem mounted wheels is in a position of least ground clearance.
Figure 7:
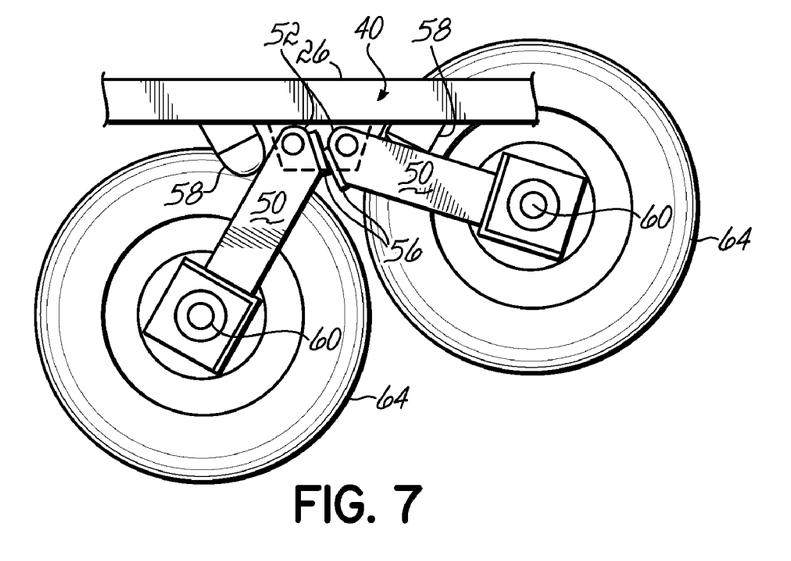
FIG. 7 is a view similar to FIG. 7, but illustrating the wheels reversed from the position illustrated in FIG. 7.

With reference now to FIGS. 6 and 7, it will be seen that because of the independent suspension of each control arm 50 and attached wheel axle 60 of each tandem suspension system 40, one wheel, as for example, the rear wheel (see FIG. 6), may be moved downwardly while the other control arm of that suspension system 40 with its attached wheel may be moved upwardly, as for example, when the wheels move over an uneven terrain or when making a skid turn. Similarly, that relationship may be reversed, as illustrated in FIG. 7 with the forwardmost wheel moving downwardly and the rearwardmost wheel moving upwardly, again, independently of one another. This independent movement of the control arms 50 and attached axles 60 of the suspension system 40 enables and facilitates movement of the vehicle over uneven terrain. And, as explained more fully hereinafter, this independent movement of the wheels of the tandem suspension systems, with their separate hydraulic motor drives for each axle facilitates skid turning of the vehicle.

Figure 11:
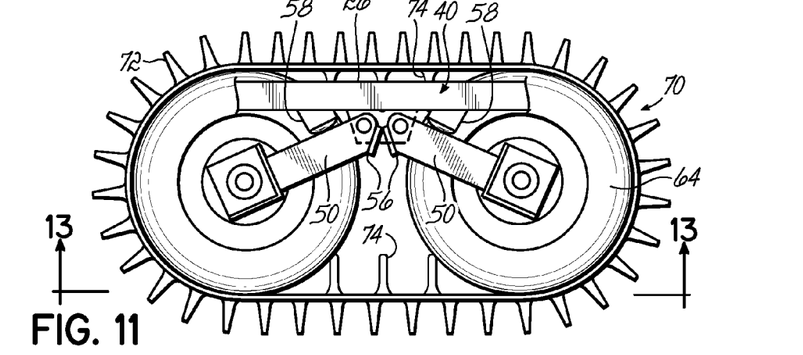
FIG. 11 is a side elevational view similar to FIG. 3, but illustrating the wheels as having an endless track applied over each pair of tandem mounted wheels.
Figure 12:
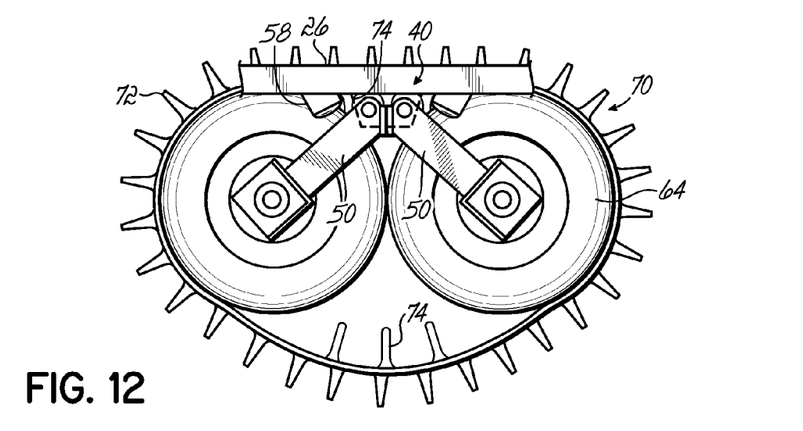
FIG. 12 is a view similar to FIG. 11, but illustrating the condition of the suspension system when the track is mounted over the wheels.

With reference now to FIGS. 11 and 12, there is illustrated another embodiment of the invention wherein endless tracks 70 are placed over each pair of tandem mounted wheel sets of each tandem suspension system 40. In this embodiment, as illustrated in FIGS. 11 and 12, those components of the tandem suspension 40 which are identical to the components of FIGS. 1-8 have been given identical numeral designations. In practice, though, the only difference between the two embodiments is that an endless track 70 has been added over each tandem set of wheels of each suspension system 40 so as to minimize ground pressure as the vehicle travels over the ground or to obtain better traction, as for example, through mud or snow covered terrain, than is possible with the wheels making contact with the ground.

As may be seen in FIG. 12, the endless track 70 is sized so that it fits over the pair of wheel sets of a single suspension system 40 when the wheels of that set are placed as close together as possible and the friction plates 56 of that wheel set are contacting. When a load is placed upon that wheel set, the wheels move apart to tension the track 70 over the wheels 64, 64a of the set.

Figure 13:
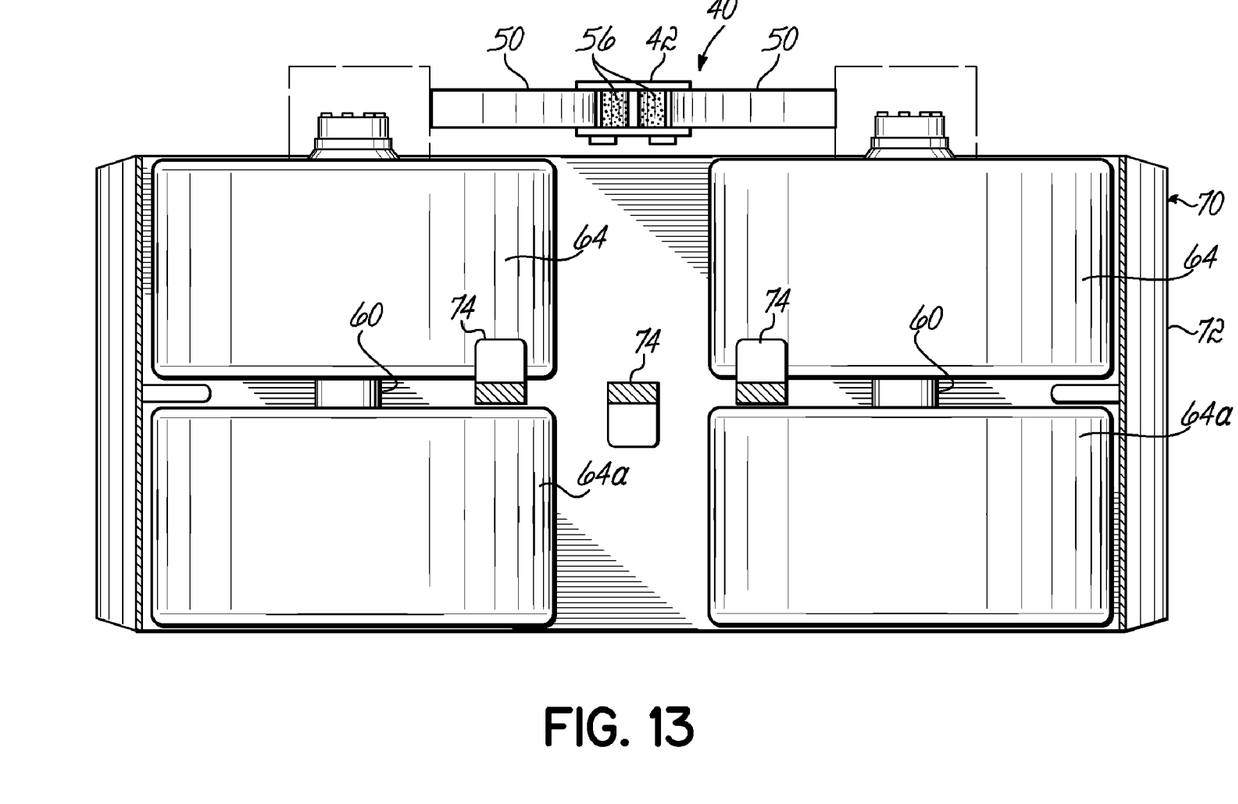
FIG. 13 is a top elevational view taken on line 13-13 of FIG. 11.

The endless track 70 has spikes 72 on its outer surface and flexible rubber lugs 74 extending inwardly from its inside surface. The rubber lugs 74, which may be made of hard plastic or other durable materials, are located medially of the width of the track and pass between the wheels 64, 64a of each set of wheels. As best illustrated in FIG. 13, alternate ones of these lugs are engageable with the inside surface of the wheel 64 (the innermost wheel of each set) and the next adjacent lugs contact the inside surface of the other wheel 64a (the outside wheel of each set of wheels). In this way, the lugs prevent the track from shifting laterally on the wheels or even being driven off the wheels in the course of skid steering of the vehicle.

Hydraulic Control Circuit

Figure 8:
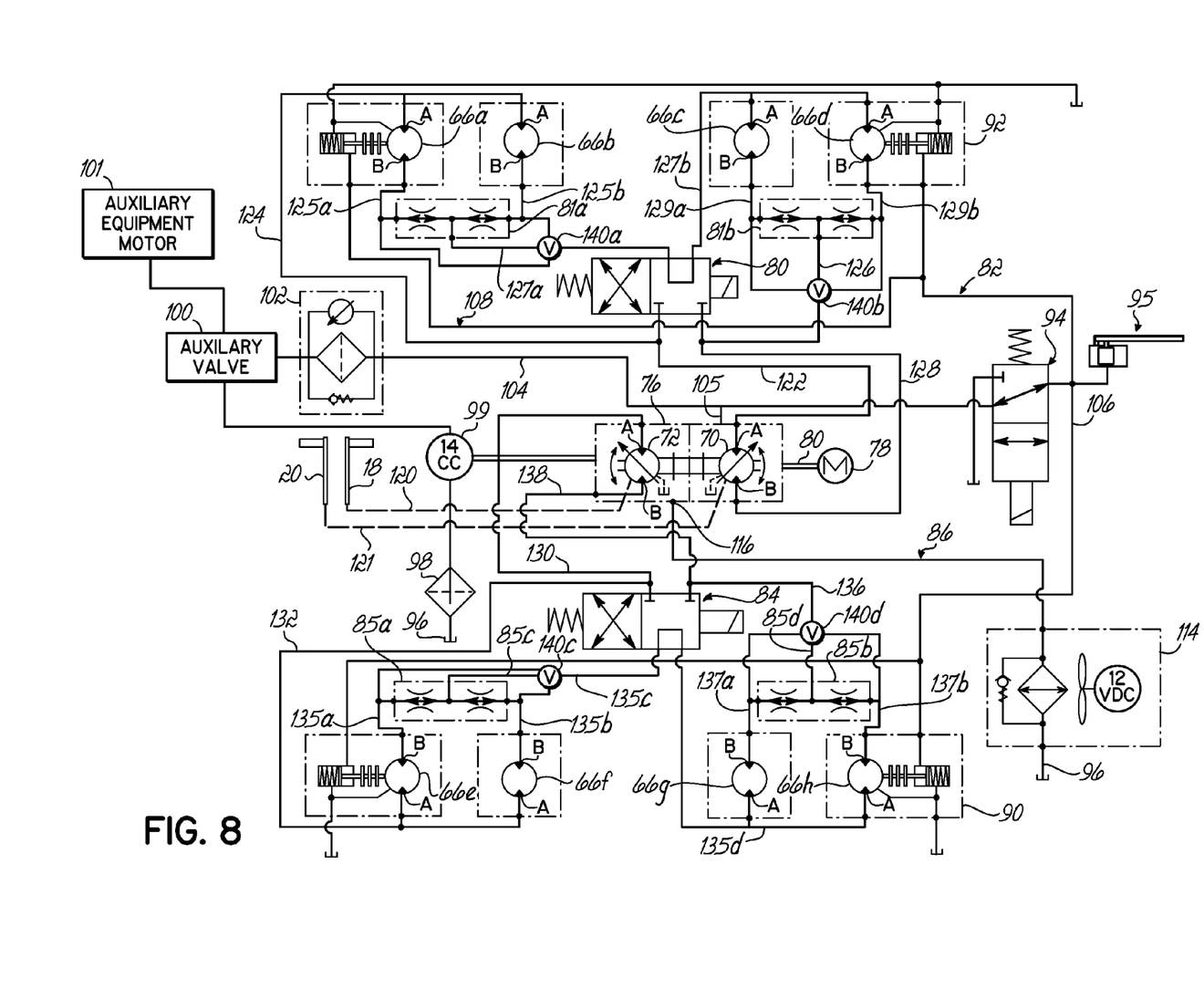
FIG. 8 is a schematic view of the hydraulic circuit utilized to drive the axle mounted hydraulic motors of the vehicle of FIG. 1. In this view, the arrows applied to the hydraulic circuit illustrate the directions of fluid flow when the control circuits of the motors on each side of the vehicle drive the wheels in the same direction in series connected circuits.
Figure 9:
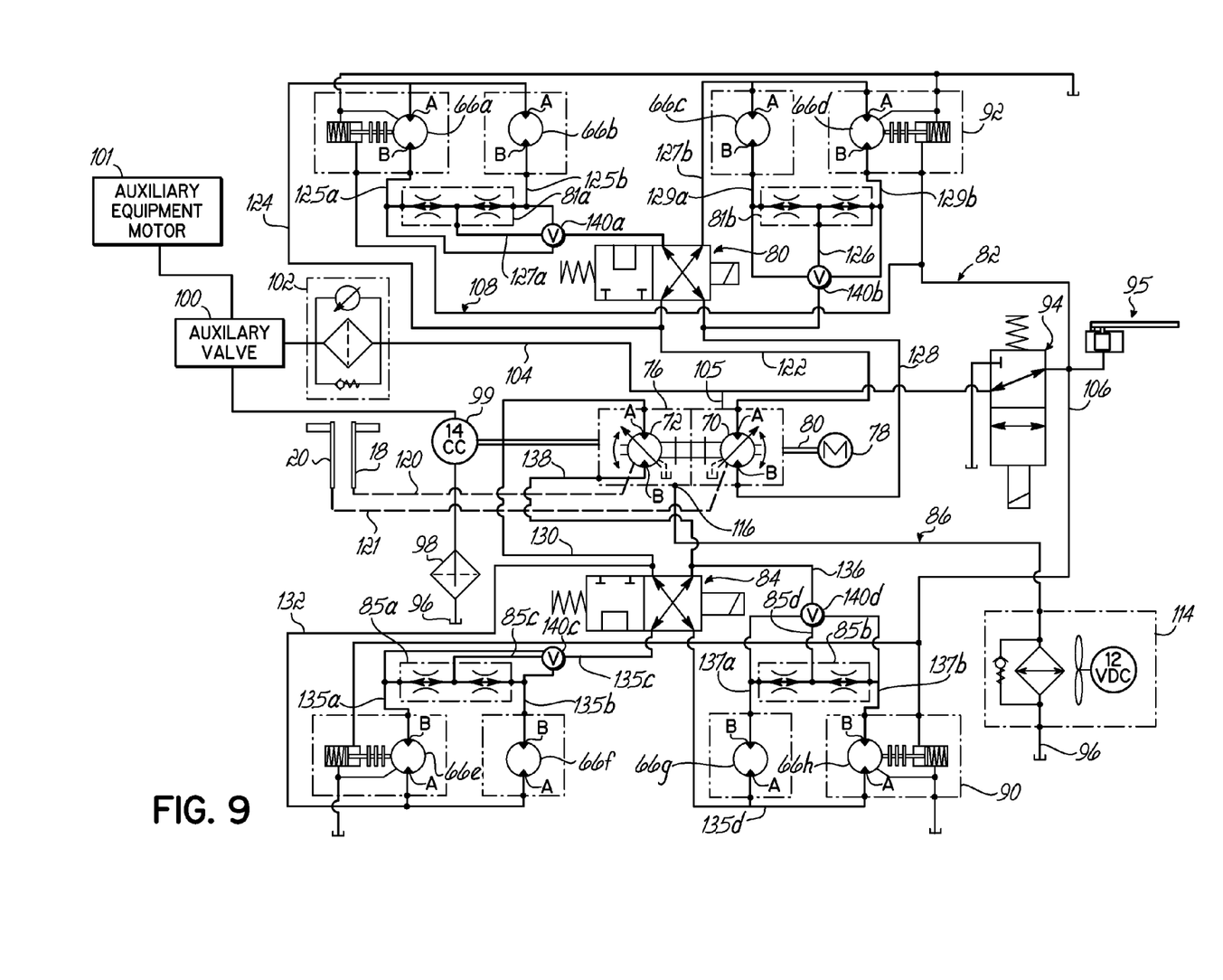
FIG. 9 is a view similar to FIG. 8 of the hydraulic control circuits, but illustrating the directions of fluid flow when the motors on each side of the vehicle are connected in parallel connected hydraulic circuits with flow control valves operable to limit spin or slip if one wheel of a set of wheels is subject to spin or slip relative to the other wheels of the sets.
Figure 10:
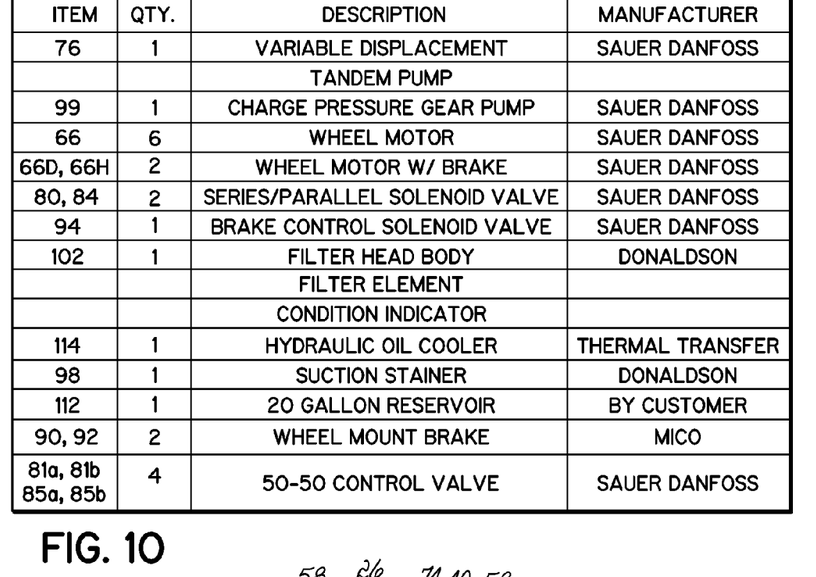
FIG. 10 is a bill of material for the components of the hydraulic circuits illustrated in FIGS. 8 and 9.

The hydraulic control circuit for controlling the hydraulic drive motors 66 on the end of each axle 60 is illustrated in FIGS. 8 and 9. In FIGS. 8 and 9, the drive motors 66 for the axles on the right side of the vehicle are designated as 66a, 66b, 66c and 66d going from front to back. And similarly, the hydraulic motors for driving the axles 60 on the left side of the vehicle are designated as 66e, 66f, 66g and 66h going from front to back. Flow of hydraulic fluid to these motors 66a-66h is provided by a pair of reversible variable displacement tandem pumps 70, 72 mounted within a common housing indicated by numeral 76. Both of these pumps are driven from a single drive motor 78 which is connected to the pumps by a common motor drive shaft 80. The direction of fluid flow from each of the pumps 70, 72 and the displacement of the pumps is controlled by the control levers 18, 20. The control lever 20 controls the direction of flow and displacement from the pump 70 to the wheel driving motors 66a-66d on the right side of the vehicle and the lever 18 controls the direction of flow and the displacement of the pump 72 to the wheel driving motors 66e-66h on the left side of the vehicle. There is a series/parallel control solenoid valve 80 in the fluid flow circuit 82 from the pump 70 to the wheel driving motors 66a, 66b, 66c and 66d. Similarly, there is a series/parallel flow control solenoid valve 84 in the flow control circuit 86 between the pump 72 and the wheel driving motors 66e, 66f, 66g and 66h on the left side of the vehicle. As explained more fully hereinafter, these series/parallel flow control valves 80, 84 determine whether flow from the pump is supplied in series to all of the motors on the right and left sides of the vehicle, respectively, or whether that flow is directed in parallel to the front two and back two wheels on each side of the vehicle. And also as explained more fully hereinafter, flow from the right side series/parallel flow control valve 80 to the right side front wheel driving motors 66a, 66b may be directed through a 50-50 flow control valve 81a, and flow from the series/parallel flow control valve 80 may be directed to the right side rear wheel driving motors 66c and 66d through a second 50-50 flow control valve 81b. Similarly, flow from the left side series/parallel flow control valve 84 to the left side front wheel driving motors 66e and 66f may be directed through a 50-50 flow control valve 85a, and flow from the left side series/parallel flow control valve 84 may be directed to the left side rear wheel driving motors 66g and 66h through a 50-50 flow control valve 85b. Flow to and through these 50-50 flow control valves 81a, 81b, 85a and 85b is controlled by solenoid valves 140a, 140b, 140c and 149d, respectively, as explained more fully hereinafter.

There is an hydraulic actuated brake 90 associated with the rearwardmost axle and wheel on the right side of the vehicle, and similarly, an hydraulic actuated brake 92 associated with the rearwardmost axle and wheel on the left side of the vehicle. Of course, there may be a greater number of brakes associated with a greater number of axles, if so desired. Actuation of these brakes 90, 92 is controlled by a brake control solenoid valve 94. Additionally, a hand-operated pump 95 is connected to the brake control solenoid valve 94 so as to enable the brakes to be deactivated in the event of a loss of electric or hydraulic power.

The motor 78, in addition to driving the shafts of the pumps 70, 72, drives the shaft of an auxiliary charge pump 99. This auxiliary charge pump supplies pressure from a reservoir 96 through a filter 98 to and through an auxiliary valve 100 to a combination filter/pressure regulator 102. A pressure gauge 103 of this regulator 102 monitors system pressure and is visible on the dash 14 (see FIG. 1) of the vehicle. The auxiliary valve 100 controls fluid flow to the motor 101 of any auxiliary equipment, such as a drilling rig associated with the vehicle.

Fluid from the pressure regulator 102 flows to the tandem pump housing 76 via lines 104 and 105 to maintain charge pressure in those pumps and to supply make-up fluid to the circuits 82 and 86. Additionally, fluid from the pressure regulator flows via hydraulic line 104 to the wheel mounted brakes 90, 92 via the brake control solenoid valve 94 and the fluid lines 106, 108 when the solenoid valve 94 is actuated. Fluid flow to these brakes releases the wheel mounted brakes so that the wheels are then free to turn. Whenever the solenoid of the valve 94 is not actuated, there is no flow through the line and no fluid pressure in the lines 106, 108 with the result that the springs associated with those brakes maintain the brakes in physical engagement with the wheel mounted brake mechanism and the wheels thereby are restrained against rotational movement. Of course, the more power required by the auxiliary equipment, the larger capacity motor 78 required to drive the vehicle, as well as the auxiliary equipment 101. A gasoline motor as small as 24 horsepower has been found suitable to drive the vehicle, but lacking in power, to drive heavy auxiliary equipment. In one preferred embodiment a 58 horsepower motor operating at 2700 rpm has been found satisfactory to drive the auxiliary charge pump 99 to operate the system and to drive a relatively heavy hydraulic motor of a drilling rig.

Operation of Hydraulic Control Circuits

In order to operate the vehicle, the start button 110 on the dash 14 is actuated so as to start the gasoline motor 78. This motor results in the start-up of the variable displacement tandem pumps 70, 72 and the auxiliary charge pump 99. Upon start-up of the tandem pumps 70, 72, fluid is returned to the reservoir 96 through an hydraulic oil cooler 114 from the variable displacement pumps case drain 116. From the charge pump 99, fluid is supplied from the reservoir 96 to each of the pumps 70, 76 via the auxiliary valve 100, pressure regulator 102 and lines 104, 105. Assuming that the vehicle is to be moved forwardly, a switch on the dash 14 is actuated so as to cause the solenoid of brake control valve 94 to be actuated, and thereby allow flow through the valve to each of the wheel motor brakes via the fluid flow lines 106, 108. Thereby, the brakes are released and the wheels are free to move either forwardly or rearwardly, as illustrated in FIG. 8.

Series Connected Mode of the Control Circuit

Assuming that the series/parallel flow control valves 80, 84 are in the series connected mode as set on the dash 14 by the machine operator, upon forward movement of the control lever 20, the swash plate of pump 70 is caused to move via a mechanical linkage indicated by the dashed line 121 to a position in which fluid flows from the pump 70. Flow from the pump 70 is via hydraulic line 122 and 124 to the inlet ports A of each of the motors 66a and 66b with 50% of the fluid flow from the pump 70 going to each of the motors 66a and 66b. Flow from these pumps then flows via lines 125a and 125b through bypass solenoid valve 140a (by passing the 50-50 flow control valve 81a) through the valve 80 and line 127b to the inlet port A of the motors 66c and 66d, again with each motor 66c and 66d receiving 50% of the total flow from the pump 70. Flow from the series connected motors 66c and 66d then is back to the inlet port of pump 70 via fluid flow lines 129a, 129b, through the bypass valve 140b (again by passing the 50-50 flow control valve 81b) and back through the hydraulic line 128 to the inlet port B of motor 70. The volume of fluid which flows in this direction and via these lines is a function of how far forward the lever 20 is pressed from its central or neutral position. If the lever 20 is moved rearwardly from its central or neutral position, then the swash plate of the pump 70 is reversed with the result that fluid flows out through the line 128 and via lines 129a and 129b to and through the motors 66c and 66d through the valve 80, lines 125a and 125b and via hydraulic lines 124, 122 back to the pump 70. In the course of this reverse flow, the motors 66a, 66b, 66c and 66d rotate in a counterclockwise direction. But, it is to be noted that whenever the flow control circuit is in the series connected mode, 50% of the total flow from the pump 70 is directed to and through each of the motors 66a, 66b, 66c and 66d.

In the same way, if the control lever 18 is moved in a forward direction and with the brake released, fluid is caused to flow from the outlet port A of the pump 72 via hydraulic lines 130, 132 to and through the series connected front wheel motors 66e, 66f. From the outlet port B of the front wheel motors 66e, 66f, fluid flows via the lines 135a, 135b through the solenoid operated bypass valve 140c (bypassing the 50-50 flow control valve 85a) via the line 135c and valve 84, through line 135d to the inlet ports A of the motors 66g and 66h. From the outlet port B of the motors 66g and 66h in the series connected mode of the control circuit, fluid flows via lines 137a, 137b through bypass valve 140d (bypassing valve 85b) and back to the inlet port B of the motor 72 via the hydraulic lines 136 and 138. If the control lever 18 is moved rearwardly from its central or neutral position, then the flow to and from the pump 72 is reversed from that described when the lever is moved forwardly. Specifically, the swash plate is moved by the mechanical linkage 120 connected to the lever 18 to a reverse position in which fluid flows out of what had formerly been the inlet port B of the pump to the motors via the hydraulic lines 138, 136 to and through the motors 66e, 66f, 66g and 66h and then back to the pump via hydraulic lines 132 and 130.

Parallel Connected Mode of the Control Circuit

There are occasions when it is desirable to drive the front pair of tandem axles in rotation on one side of the vehicle while leaving the other pair of tandem axles and wheels mounted thereon relatively stationary on that same side of the vehicle. This is particularly advantageous when skid steering or turning the vehicle by rotating the tires on one side of the vehicle in one direction and the tires on the opposite side of the vehicle in the opposite direction. If one pair of axles and wheels on one side of the vehicle are rotated while the other pair of axles and wheels on the same side are left relatively stationary or rotating more slowly, the vehicle skid turns more effectively and with a much shorter radius than would be the case if all wheels on opposite sides were turning in opposite directions. This movement of one pair of wheels while the other pair on the same side of the vehicle remain stationary or rotating more slowly may be accomplished by connecting the wheel driving motors on one side of the vehicle in a parallel circuit in which the two front wheel drive motors are connected in parallel with the two rear wheel drive motors. When so connected, either the front wheel pair of motors or the rear wheel pair of motors will be driven in rotation while the other pair of motors will rotate more slowly or will remain relatively stationary, depending on which motors receive the less downward pressure. The fluid flow will go to those motors which have the least pressure on them and it will be those motors which will rotate while the other pair will rotate more slowly or will remain stationary. So rotated, the vehicle will tend to turn, or skid turn, as a result of this condition, particularly, if the turning wheels on the opposite side of the vehicle are rotated in an opposite direction from those rotating on the first side of the vehicle.

In order to operate the vehicle with the fluid motors on each side of the vehicle connected in a parallel flow control circuit, rather than a series flow control circuit, as in FIG. 8, a turn control button on the dash 14 is actuated by the machine operator. Actuation of this button causes the solenoids of the series/parallel control solenoid valves 80, 84 to be actuated so as to place the valves in the condition illustrated in FIG. 9.

In the practice of this invention, and as illustrated in FIG. 9, the parallel control circuits there illustrated are operable in two different modes, one a parallel control mode with limited slip and the other a parallel control mode with flow control.

Parallel Control Mode with Limited Slip

When the solenoid series/parallel flow control valves 80, 84 are actuated so as to be positioned as illustrated in FIG. 9 and the control lever 20 is moved forwardly, fluid is caused to flow under pressure via the line 122 and then to be split into flow via the line 124 to the inlet ports A of motors 66a, 66b with 50% of the flow in line 124 going to the inlet ports of each of the motors 66a and 66b and simultaneously, to be caused to flow through the valve 80 via line 127b to the inlet ports A of motors 66c and 66d. Flow from the outlet of motors 66a, 66b flows via lines 125a, 125b, through the solenoid bypass valve 140a (bypassing the 50-50 flow control valve 81a) and then back through the valve 80 to the line 128. Simultaneously, flow from the outlet port B of motors 66c and 66d flows via lines 129a and 129b, through the bypass valve 140b (bypassing 50-50 flow control valve 81b) and line 128 back to the inlet of pump 70. Consequently, the two front driven motors 66a and 66b are connected in a parallel hydraulic circuit with the two rear wheel driven motors 66c and 66d in the parallel control mode of the hydraulic control circuit. If the wheels are to be driven in a reverse direction, then the lever 20 is pulled rearwardly from its center position so as to reposition the swash plate of the pump 70 in a reverse position, whereby fluid flows out of the fluid line 128 to the parallel connected circuits to these motors and is returned via line 122.

Similarly, if the wheels on the left side of the vehicle are driven in a forward direction, but in a parallel connected circuit wherein the front two wheel driving motors 66e, 66f are connected in a parallel hydraulic circuit with the two rear wheel driven motors 66g and 66h, then a switch on the dash 14 is operated by the machine operator to place the series/parallel solenoid control valve 84 in the position illustrated in FIG. 9. Then, when the lever handle 18 is moved forwardly, fluid is caused to flow from the pump 72 via lines 130, 132 to the inlet port A of the motors 66e and 66f and simultaneously via the valve 84 and hydraulic line 135d to the inlet port A of motors 66g and 66h. Fluid flow from the outlet ports B of motors 66e and 66f in the parallel mode of operation of the control circuit flows through lines 135a, 135b, through the bypass valve 140c (bypassing the 50-50 flow control valve 85a) via line 135c and series/parallel flow control valve 84 back to the inlet port B of pump 72 via line 138. Simultaneously, fluid from the outlet port B of the motors 66g and 66h flows via lines 137a, 137b, valve 140d (bypassing valve 85b) and line 136 to line 138. The line 138 then returns fluid from both parallel connected circuits to the inlet port of the pump 72. If the lever control 20 is pulled rearwardly by the operator from a neutral or centered position, again with the control circuit in the parallel operating mode, then the swash plate of the variable displacement pump 72 is reversed, causing fluid flow to flow out through the outlet port of the pump to line 138 and be returned to the pump via line 130, thereby causing the motors of the wheel driving axles on the left side of the vehicle to be rotated in a counterclockwise direction, as viewed in FIG. 9.

It will be appreciated that in the parallel mode of operation of the control circuits, and assuming that there is equal resistance to each motor 66a-66d, for example, then 25% of the flow will be directed to each motor 66a, 66b, 66c and 66d. This is opposed to 50% of the flow to each wheel when the control circuit is in the series connected mode as explained hereinabove. But, in the parallel circuit control mode, if one set of wheels, as for example, the front set of wheels encounters greater resistance to rotation, then the rear set of wheels would receive all of the flow since the flow would be directed to the least resistant and, theoretically, the front wheels would be stationary. And again theoretically, if the rear wheels were suspended in space and encountering no resistance to rotation, the flow would all be directed to the suspended wheels which would spin, but the vehicle would not move. The inclusions of the 50-50 flow control valves 81a, 81b, 85a and 85b in the control circuits prevents the spinning wheel, non-movement condition from ever occurring in the parallel control circuit mode by always imparting some resistance to flow in all conditions of the parallel flow control circuit.

Parallel Control Mode with Flow Control

The solenoid operated bypass valves 140a, 140b, 140c and 140d inserted into the circuits to each set of motors 66a-66h enable the 50-50 flow control valves to be bypassed. But, the inclusion of the 50-50 flow control valves 81a, 81b, 85a and 85b in each of the circuits to each set of motors 66a-66h, when the solenoid valves 140a, 140b, 140c and 140d are actuated, prevent the 50-50 flow control valves from being bypassed and thereby prevent all flow going to the set of motors which are encountering little or no resistance.

To actuate the solenoid valves 140, a switch (not shown) on the dashboard of the control panel 14 of the vehicle is actuated by the machine operator. When this switch is actuated, all four of the solenoid valves 140a, 140b, 140c and 140d are actuated so that the 50-50 flow control valves 81a, 81b, 85a, 85b are all no longer bypassed.

Again with reference to FIG. 9, when the solenoid bypass valve 140a is actuated, flow from the ports B of the motors 66a and 66b are routed via lines 125a and 125b through the 50-50 flow control valve 81a and via line 127a to and through the bypass valve 140a. Similarly, when solenoid bypass valve 140b is actuated, flow from the ports B of the motors 66c and 66d is routed via the lines 129a and 129b to the 50-50 flow control valve and from the valve via line 126 through the bypass control valve 140b. Similarly, the B ports of the motors 66e and 66f are connected via lines 135a and 135b to the 50-50 flow control valve 85a and to the valve 85a is connected by a line 85c through the bypass valve 140c. Likewise, the ports B of the motors 66g and 66h are connected by lines 137a and 137b to the 50-50 flow control valve 85b and by line 85d to the bypass valve 140d. Thereby, in the parallel flow mode with flow control of the circuits, the flow to each set of wheels will not all be directed to the wheel or set of wheels which has little or no resistance to turning. Instead, approximately 50% of the flow to each set of wheels will be directed in this mode of control to each motor of a set of motors. This has no application when the vehicle is moving over relatively even terrain with relatively even weight distribution upon each wheel such that there is equal traction on each wheel. But on uneven terrain, or if one wheel of a set of wheels counters less resistance to turning, as for example, moves over a hole with all of the weight on the other wheel of the set, then absent the 50-50 flow control valves, the one non-weight bearing wheel would rotate freely while the weight-carrying wheel would be stationary. With the valves 140a, 140b, 140c and 140d activated though, flow is directed through the 50-50 flow control valves 81a, 81b, 85a, 85b so that when in the parallel control mode with flow control, some flow is always directed to both motors of each set of motors through the 50-50 flow control valves.

As mentioned hereinabove, the primary advantage of connecting the wheels on the right side of the vehicle in a parallel connected circuit 82 and the wheels on the opposite side of the vehicle in another parallel connected circuit 86, such that the forwardmost wheels of the forwardmost suspension system 40 are connected in one portion of the parallel circuit and the rearwardmost wheels of the rearwardmost suspension system 40 are connected in another parallel circuit is that it enables one set of wheels to be driven in rotation while the other set of wheels rotate more slowly or remain substantially stationary. When the wheels on opposite sides of the vehicle are connected in the parallel control circuits, as illustrated in FIG. 9 and are rotated in opposite directions by moving one lever, as for example, lever 18 forwardly and the other lever 20 rearwardly, one set of wheels, as for example, the forward set on one side will move forwardly while the other rearward set rotates more slowly or remain substantially stationary. And, the rearward set of wheels on the opposite side will rotate forwardly while the forward set of wheels rotate more slowly or remain substantially stationary. In fact, one of the wheels of the stationary set of wheels on each side of the vehicle may even be lifted out of ground contact by the other wheel of the set acting through their respective control arms 50 and contacting friction plates 56. This enables the vehicle, when in the parallel control circuit mode, to be skid turned in a tighter radius and with greater facility than is possible when the wheels are all series connected on each side of the vehicle. But in the series connected circuits, all wheels obtain the same flow at the same pressure with the result that all of the wheels are driven at the same rate of rotation and with the same torque. This too has its advantages when the vehicle is operated in a non-turning mode because it enables the vehicle to move with greater traction and speed than is possible with the wheel driving motors connected in parallel circuits.

While we have described several different embodiments of our invention, persons skilled in this art will appreciate changes and modifications which may be made without departing from the spirit of our invention. For example, in lieu of having two rims and two pneumatic tires mounted upon each of the eight axles of the vehicle, there may be only a single wheel rim and a single pneumatic tire mounted upon each axle, in which event the tires will generally be larger in diameter and width so as to minimize the decrease of combined wheel footprint over the eight axle, sixteen wheel vehicle which is illustrated in the drawings of this application. And, of course, if the vehicle is converted from an eight axle, sixteen wheel vehicle to one with eight axles and eight wheels, if an endless track is to be used on the vehicle as illustrated in FIGS. 11-13, then the guide lugs of the track will necessarily engage both the inside and outside of the tires rather than the inside only, as illustrated in FIG. 13. Additionally, the suspension system of this system may be utilized in combination with other wheel driven systems, as for example, a system wherein each motor driven axle is driven by an electric motor, rather than an hydraulic motor. These and other changes and modifications will be readily apparent to persons skilled in this art. Therefore, we do not intend to be limited except by the scope of the following appended claims.

We claim:

1. An eight axle, skid steering vehicle comprising:
a generally rectangular frame having a pair of opposed side members;
four hanger brackets fixed to each side member of the frame;
a pair of independently movable control arms suspended downwardly in opposite directions from each hanger bracket, each control arm being pivotally mounted at a first end upon a hanger bracket;
a wheel axle mounted on a second end of each control arm;
at least one wheel hub mounted on each wheel axle;
a pneumatic wheel mounted upon each wheel hub;
a resilient spring located between the frame and each control arm to bias the control arms away from the frame; and
a friction plate mounted upon each control arm, each pair of friction plates on each pair of control arms making contact with each other to limit movement of each pair of control arms toward one another.

2. A low surface impact, skid steered, all terrain vehicle comprising:
a generally rectangular frame having a pair of opposed side members;
at least one tandem suspension system on each of said side members;
each suspension system comprising a pair of independently movable control arms pivotally suspended at one end from a side member, there being at least four control arms suspended from said side members;
a wheel axle mounted on an opposite end of each control arm;
at least one wheel hub mounted upon each wheel axle;
a pneumatic wheel mounted upon each wheel hub; and
a friction plate mounted upon each control arm, each pair of friction plates on each pair of control arms making contact with each other to limit movement of each pair of control arms toward one another.

3. The all terrain vehicle of claim 2 which further comprises
an endless track mounted over the pneumatic wheels of each suspension system.

4. The all terrain vehicle of claim 3 wherein there are a pair of wheel hubs and pneumatic wheels mounted upon each wheel axle.

5. The all terrain vehicle of claim 4 wherein there are a plurality of lugs extending inwardly from an inside surface of each of said endless tracks, said lugs extending between an inside surface of each pair of pneumatic wheels on each of said wheel axles so as to prevent said endless tracks from running off of said wheel hubs.

6. The all terrain vehicle of claim 5 wherein selected ones of said lugs are engageable with an inside surface of one of said wheel hubs on each of said wheel axles and others of said lugs on each of said endless tracks are engageable with an inside surface of the other of said pair of wheel hubs on each of said wheel axles.

7. The all terrain vehicle of claim 2 which further comprises a resilient spring located between the frame and each control arm to bias the control arms away from the frame.

8. The all terrain vehicle of claim 2 wherein said pneumatic wheels comprise pneumatic tires mounted upon each wheel hub.

9. The all terrain vehicle of claim 8 wherein there are a pair of wheel hubs mounted upon each wheel axle.

10. The all terrain vehicle of claim 2 which further comprises a hydraulic motor secured to at least one wheel axle on each side of said frame, each hydraulic motor being operative to drive the wheel axle to which it is secured.

11. The all terrain vehicle of claim 10 further comprising:
first and second motor driven pumps;
a first hydraulic circuit for supplying fluid power from said first motor driven pump to all of the hydraulic motors drivingly secured to the wheel axles on a first side of said frame;
a second hydraulic circuit for supplying fluid power from said second motor driven pump to all of the hydraulic motors drivingly secured to the wheel axles on a second side of said frame; and
said first and second hydraulic circuits being operable to interconnect the hydraulic motors on one side of the frame either in a parallel connected circuit or a series connected circuit.

12. A low surface impact, skid steered, all terrain vehicle comprising:
a generally rectangular frame having a pair of opposed side members;
a pair of tandem suspension systems on each of said side members;
each suspension system comprising a pair of independently movable control arms pivotally suspended at a first end from a side member, each control arm of each pair of control arms extending downwardly in opposite directions from a side member;
a wheel axle mounted on a second end of each control arm;
a hydraulic motor secured to at least one wheel axle on each side of said frame, each hydraulic motor being operative to drive the wheel axle to which it is secured;
at least one wheel hub mounted upon each wheel axle;
a pneumatic wheel mounted upon each wheel hub; and
a friction element mounted upon said first end of each control arm to limit movement of each pair of control arms.

13. The all terrain vehicle of claim 12 further comprising:
first and second motor driven pumps;
a first hydraulic circuit for supplying fluid power from said first motor driven pump to all of the hydraulic motors drivingly secured to the wheel axles on a first side of said frame;
a second hydraulic circuit for supplying fluid power from said second motor driven pump to all of the hydraulic motors drivingly secured to the wheel axles on a second side of said frame;
said first and second hydraulic circuits being operable in a first mode to interconnect the hydraulic motors on one side of the frame in series and in a second mode to connect the same hydraulic motors in parallel; and
said first and second hydraulic circuits being operable to drive the hydraulic motors on one side of said frame in one direction and the hydraulic motors on the opposite side of said frame in an opposite direction to effect turning of said vehicle and, when in the second parallel mode, enable the vehicle to turn in a shorter radius than when in the first series connected mode.

14. The all terrain vehicle of claim 13 wherein in the second parallel mode of the first and second hydraulic circuits, the hydraulic motors secured to the wheel axles to one tandem suspension system on one side of the vehicle may be caused to rotate while the hydraulic motors secured to the wheel axles of a second tandem suspension system on the same side of the vehicle are caused to remain substantially stationary during turning movement of the vehicle.

15. The all terrain vehicle of claim 12 which further comprises a resilient spring located between the frame and each control arm to bias the control arms away from the frame.

16. The all terrain vehicle of claim 12 wherein each friction element comprises a friction plate mounted upon each control arm to limit movement of each pair of control arms toward one another and prevent the pneumatic wheels on each pair of control arms from coming into abutting contact with one another.

17. A low surface impact, skid steered, all terrain vehicle comprising:
a rectangular frame;
a pair of sets of tandem mounted, independently movable control arms suspended from opposite sides of the frame such that there are at least four control arms suspended from each side of the frame;
a hydraulic motor driven wheel axle mounted on a lower end of each control arm;
at least one wheel mounted upon each wheel axle;
a pair of hydraulic control circuits each having its own separate motor driven pump operable to drive hydraulic motors on each wheel axle on each side of the vehicle;
each hydraulic control circuit being connectable in either a series connected mode or a parallel connected mode and in the series connected mode, providing substantially equal fluid flow and pressure to all of the hydraulic motors on one side of the vehicle so as to obtain substantially equal wheel speed and minimize wheel slippage with a surface upon which the vehicle is supported; and
each hydraulic control circuit, when operating in the parallel connected mode, driving the hydraulic motors on front and rear sets of wheels with differing fluid flow and pressure so that when the wheels on opposite sides of the vehicle are driven in opposite directions, skid steering of the vehicle is improved over that obtainable when the hydraulic control circuits are in the series connected mode, said hydraulic control circuits, when in the parallel connected mode, including proportional flow control valves operable to prevent all fluid flow from flowing to the hydraulic motor of the wheel axle which encounters the least resistance to wheel rotation.

18. The all terrain vehicle of claim 17 wherein when the hydraulic control circuits are operating in the parallel connected mode and are operated so as to drive the hydraulic motors and wheels driven thereby on opposite sides of the frame in opposite directions, the one set of wheels on each side may be caused to rotate while another set of wheels on the same side may be caused to remain substantially stationary during turning movement of the vehicle.

19. The all terrain vehicle of claim 18 wherein there are a pair of tandem connected front wheel axles and a pair of tandem connected rear wheel axles on each side of the vehicle.

20. The all terrain vehicle of claim 19 wherein the hydraulic motors drivingly secured to each of the pair of tandem connected front wheel axles are connected in parallel and the hydraulic motors drivingly secured to the pair of tandem connected rear wheel axles are connected in parallel so that when the hydraulic motors are connected in a series connected circuit, each hydraulic motor receives approximately equal flow from one of said motor driven pumps.

21. The all terrain vehicle of claim 20 wherein the proportional flow control valves comprise 50-50 flow control valves operably connected in the hydraulic control circuits to the hydraulic motors drivingly secured to each pair of tandem connected wheel axles.

22. The all terrain vehicle of claim 21 which further includes an engine for driving each of said first and second motor driven pumps, said engine also being operable to drive an auxiliary pump, said auxiliary pump being connected in a hydraulic circuit to an auxiliary valve for controlling flow of hydraulic fluid from said auxiliary pump to auxiliary equipment mounted upon said vehicle.

* * * * *